(12) United States Patent
Weaver Johnson et al.

(10) Patent No.: US 6,173,421 B1
(45) Date of Patent: *Jan. 9, 2001

(54) CENTRALLY HANDLING RUNTIME ERRORS

(75) Inventors: Eric Wendell Weaver Johnson; Neelamadhaba Mahapatro, both of Redmond, WA (US)

(73) Assignee: Microsoft Corporation, Redmond, WA (US)

(*) Notice: Under 35 U.S.C. 154(b), the term of this patent shall be extended for 0 days.

This patent is subject to a terminal disclaimer.

(21) Appl. No.: 09/267,922

(22) Filed: Feb. 26, 1999

Related U.S. Application Data (62) Division of application No. 08/844,391, filed on Apr. 18, 1997.

(51) Int. Cl.[7] .......................... G06F 11/00; G06F 15/163; G06F 9/45
(52) U.S. Cl. ..................... 714/38; 709/303; 395/703; 717/3; 717/4; 717/8
(58) Field of Search .................................. 714/38, 48, 49; 709/302, 303; 710/260; 395/703, 704, 708, 709, 212

(56) References Cited

U.S. PATENT DOCUMENTS

| | | | |
|---|---|---|---|
| 5,335,344 | * 8/1994 | Hasting | 713/2 |
| 5,583,988 | * 12/1996 | Crank | 714/48 |
| 5,628,016 | * 5/1997 | Kukol | 395/704 |
| 5,893,121 | * 4/1999 | Ebrahim et al. | 707/206 |
| 5,920,725 | * 7/1999 | Ma et al. | 395/712 |
| 5,948,113 | * 9/1999 | Johnson | 714/38 |
| 5,953,529 | * 9/1999 | Kato | 714/48 |

* cited by examiner

*Primary Examiner*—Robert W. Beausoliel, Jr.
*Assistant Examiner*—Willie Martin
(74) *Attorney, Agent, or Firm*—Kilpatrick, Stockton LLP (57) ABSTRACT

Centrally handling a runtime error or exception of a program using a central object stack and exception handling code centrally maintained within a global object manager. The global object manager is a data structure separate from the program's call stack. When a modified TRY statement is executed, a location is marked on the central object stack. During execution of a section of code after the modified TRY statement, if a new object is needed, the global object manager efficiently allocates the new object. The global object manager either allocates the new object directly from memory or attempts to re-use a previously allocated object in a cache of available objects as the new object. The new object is then registered on the central object stack and a pointer to the new object is registered on the program's call stack. This keeps the new object and associated exception handling code off the program's call stack.

When an exception is thrown, the global object manager cleans up and unregisters an object which was registered on the central object stack since the marked location. If a re-use condition is met, the object is kept in the cache as an available object already allocated from memory. However, if the re-use condition is not met, the object is de-allocated from memory.

19 Claims, 3 Drawing Sheets

CENTRALLY HANDLING RUNTIME ERRORS

This is a division of application Ser. No. 08/844,391 filed on Apr. 18, 1997 and currently pending.

TECHNICAL FIELD

This invention generally relates to handling runtime errors in a computer and, more particularly described, relates to centrally handling a runtime error or exception using a central object stack and exception handling code in a data structure separate from a program's call stack.

BACKGROUND OF THE INVENTION

A runtime error, also known as an exception in computer programming, is an anomalous situation that occurs during execution of a computer program. For example, in an object-oriented programming environment, an exception may occur when a particular object fails to operate in some way. Without proper handling of the exception, the computer program may produce unexpected results and, moreover, may halt execution of the program. However, a skilled computer programmer is likely to account for such an exception via code which services or handles the exception. This exception handling code essentially cleans up the memory used by an object. In this manner, the program is able to use the exception handling code to recover from the failure and continue proper execution of the program.

Runtime errors or exceptions may be handled by schemes built into the programming language itself. Using a built-in exception handling scheme, the exception is typically handled by code outside the normal flow of actual code. For example, the Visual C++ object-oriented programming language, developed and marketed by Microsoft Corporation of Redmond, Washington, provides an exemplary built-in scheme for handling runtime errors or exceptions. In Visual C++, the compiler implements exception handling using a TRY/CATCH paradigm. Essentially, a TRY statement is followed by a section of code where an exception may occur during execution of the code section. The process of raising an exception when the exception occurs in this code section is generally called "throwing" the exception. The "thrown" exception is "caught" or handled by a CATCH block of exception handling code. Within the CATCH block of code, the memory associated with an object is cleaned up to prevent a situation where the object, which is no longer in use, is left allocated from system memory. This situation is called a memory leak. Memory leaks are undesirable because they force the computer to maintain allocated system memory unnecessarily and can negatively impact performance of the executing computer program.

Built-in exception handling schemes, like the TRY/CATCH approach supported in Visual C++, are easy for computer programmers to implement. Computer programmers are able to take advantage of built-in exception handling schemes without having to spend time writing additional code to handle runtime errors or exceptions. Generally, a built-in exception handling scheme automatically cleans up the memory allocated on the program's call stack. In this manner, a built-in exception handling scheme, such as the TRY/CATCH approach supported by Visual C++, is viewed as easy to use because the built-in exception handling scheme requires no extra work for the computer programmer.

However, sometimes built-in exception handling schemes can make the compiled executable memory size of the computer program undesirably large. This is usually because the approach used by many programming languages, such as Visual C++, introduces a substantial amount of extra code when compiled into an executable form. This extra code is essentially inserted in along with the actual program code by the compiler. Compilers generally translate source code of a computer program written in a high-level language (such as Visual C++) into object code capable of being executed on the computer. When the built-in compiler exception handling scheme is turned on, the compiler translates program instructions or statements and inserts exception handling code throughout the compiled program. Using the built-in exception handling scheme of the compiler, the code handling an exception for a failed object must also appear with each instance of the object on the program's call stack. Unfortunately, this may make the size of the executable program undesirably large and waste valuable memory needed during run-time. In one example, the extra code for handling exceptions added by the compiler to the actual program code amounted to approximately 33% of the overall size of the compiled executable program.

Furthermore, this kind of built-in exception handling scheme typically requires the exception handling code to unwind the program's call stack. The program's call stack must be unwound to determine which of the objects were allocated before the exception and require cleaning up. More particularly, unwinding the program's call stack involves de-allocating or destructing all automatically allocated memory objects that were constructed since the TRY statement. As a result, unwinding the program's call stack is fairly complex and typically requires an undesirably large amount of code. Furthermore, the process of unwinding the program's call stack can be timely and memory intensive.

Memory fragmentation often may occur after a large number of objects are allocated and de-allocated. For example, a new object is typically allocated from the system memory reserved for the program, also called the heap, when a section of code needs the new object during execution. De-allocation usually occurs when an exception must be handled associated with the object or when the object is no longer used after completion of a function. The continuous allocation and de-allocation of thousands of temporary objects from the system memory can lead to an undesirable condition of memory fragmentation over time.

Typically, a process known as heap compaction can be used to merge small units of system memory into larger units of system memory. The system memory is merged into larger units so that the system memory can be used more efficiently. However, the heap compaction process must be performed off-line when the application program is not concurrently executing. System memory fragmentation is a concern when handling exceptions because handling exceptions involves cleaning up or de-allocating the system memory associated with the program. Thus, system memory fragmentation should be avoided when handling exceptions.

Other exception handling schemes use different programming constructs to avoid the need to unwind the program's call stack. For example, the Microsoft Foundation Class (MFC) 2.0 is a library of predefined classes of programming objects and macros developed and marketed by the Microsoft Corporation of Redmond, Wash. Within MFC 2.0, there is an exception handling scheme implemented using a simple SETJMP/LONGJMP mechanism. Using the SETJMP/LONGJMP mechanism, the program's call stack no longer must be unwound to handle exceptions. Instead, an exception immediately jumps to the appropriate handler for that exception. Thus, some of the memory overhead associated with using built-in schemes for exception handling can be reduced.

However, the SETJMP/LONGJMP mechanism in MFC 2.0 still requires the computer programmer to have extra code stored on the program's call stack to give the location of each allocated object. Furthermore, allocated objects are not re-used when using the SETJMP/LONGJMP mechanism to handle exceptions. All allocated objects are strictly de-allocated from system memory when they are no longer needed or when the exception handling schemes cleans up the memory (e.g., the allocated object) after an exception is thrown. Thus, system memory fragmentation can still be a problem using the SETJMP/LONGJMP mechanism from MFC 2.0.

Furthermore, the SETJMP/LONGJMP mechanism in MFC 2.0 does not prevent memory leaks. One way to prevent a memory leak when using the SETJMP/LONGJMP mechanism in MFC 2.0 is to require the programmer to write each separate exception handling cleanup code explicitly through the program. Therefore, the programmer is still required to do a great deal of work to effectively use the SETJMP/LONGJMP mechanism in MFC 2.0.

Therefore, there is a need for a system for efficiently handling an exception or runtime error while (1) avoiding unwinding of the program's call stack, (2) avoiding placing extra code on the program's call stack to handle the exception or runtime error, (3) reducing the size of the application's executable program module, (4) supporting the re-use of allocated objects, and (5) minimizing memory fragmentation, thus improving overall performance.

SUMMARY OF THE PRESENT INVENTION

The present invention satisfies the above-described needs by providing a system and method for centrally handling a runtime error or exception of a program. The present invention also provides a data structure with interrelated modules, each used when centrally handling a runtime error or exception of a program. The present invention also provides a method of communicating with such a data structure to centrally handle a runtime error or exception of a program.

In general, the present invention provides a method for centrally handling a runtime error of a program. Typically, an object may be created in memory and registered on a central object stack. Available objects may also be created in memory. If one of the available objects, which are already allocated from memory, matches the type of the object, then the available object may be re-used as the object. Re-use of allocated objects, such as the available object, advantageously minimizes and avoids unnecessary memory fragmentation.

Subsequent to creating and registering the object on the central object stack, a runtime error may occur during execution of a section of the program. The runtime error is handled by determining if the object was registered during execution of the program section prior to when the runtime error occurred. If so, an error handling code associated with the registered object is determined. The error handling code is centrally maintained separate from an program's call stack. Once determined, the error handling code is executed in order to clean up memory associated with the registered object. Typically, this unregisters the registered object from the central object stack.

The unregistered object may then be de-allocated from memory. However, if a predetermined condition is met, the unregistered object may be maintained within a cache as an available object already allocated from memory. The predetermined condition may be a test of whether the available objects include less than a predefined number of available objects of the same type as the unregistered object. The predetermined condition may also be a test of whether the size of the unregistered object is less than a threshold.

Using the central object stack and centrally maintained error handling code in the above-described manner, the runtime error is centrally handled while advantageously avoiding unwinding the program's call stack. Furthermore, centrally handling a runtime error in this manner also avoids placing extra code on the program's call stack to handle the runtime error and helps to minimize the compiled executable size of a program module using the above-described method.

More particularly described, the present invention provides a computer-readable medium on which is a program for centrally handling an exception during execution of a code section of the program. When executing the program, a predetermined instruction (such as a modified TRY statement) is encountered and executed. This predetermined instruction is associated with the particular section of the code. In response to the predetermined instruction, a current location on a central object stack within an object manager module is marked as a marked location. The object manager module is a data structure which is separate from a call stack of the program.

After marking the location, the section of code is executed. During execution of the code, a new object may be created. The new object may match the type of an available object from a cache of available objects already allocated from the memory. If so, the available object may be re-used as the new object and registered on the central object stack. If not, the new object may be allocated from memory and then registered on the central object stack. Re-using available objects already allocated from memory helps to minimize undesirable memory fragmentation.

When the exception occurs during execution of the code, a determination is made whether an object registered on the central object stack was registered after the marked location. If so, a selection of an exception handling code associated with the registered object is made by referring to the object manager module. The exception handling code is another module which is centrally maintained within the object manager module. The exception handling code is executed to clean up the memory associated with the registered object, thereby centrally handling the exception. Using the central object stack and the centrally maintained exception handling code in this manner advantageously reduces the executable size of the section of code.

Additionally, the registered object may be unregistered from the central object stack and maintained as an available object if a predetermined condition for re-using the unregistered object is met. The predetermined condition may be when available objects include less than a predefined number of available objects of the same type as the unregistered object. The predetermined condition may also be if the size of the unregistered object is less than a threshold. However, if the predetermined condition is not met, the unregistered object may be deallocated from memory.

The present invention and its advantages, those described above and otherwise, will be appreciated from studying the following detailed description and drawings, and the appended claims.

DETAILED DESCRIPTION

An embodiment of the present invention is described for centrally handling a runtime error or exception using a central object stack and centrally maintained exception handling code related to the objects on the central object stack. Traditionally, objects are allocated on an application's call stack as they are needed when the program code of the application is executed. However, in an embodiment of the present invention, a central object stack is used instead. The central object stack is independent and separate from the application's call stack. The exception handling code used to clean up the memory associated with an object is also separate from the program's call stack. The exception handling code is advantageously centralized rather appearing at each location with an allocated object. This helps to reduce the size of the compiled executable form of the program code. Furthermore, the present invention can efficiently re-use allocated memory when handling a runtime error or exception using a pool or cache of available objects already allocated from memory. If a re-use condition is met, an object is kept within the cache as an available object rather than being immediately de-allocated back to system memory. In this manner, memory fragmentation is minimized.

The preferred embodiment of the present invention is represented by a program module called "TEAM MANAGER", which is developed by Microsoft Corporation of Redmond, Wash. The "TEAM MANAGER" program module can be used to consolidate, coordinate and manage a team's activities or tasks. Briefly described, the "TEAM MANAGER" program module (TM module) includes an object manager module called the global object manager. The global object manager is a data structure which maintains a central object stack of objects in use at any given time on a per-thread basis. The global object manager also maintains exception handling code for cleaning up the memory associated with each object on the central object stack. Furthermore, the global object manager is responsible for efficient allocation and de-allocation of memory objects using a cache of previously allocated objects not currently in use. The global object manager data structure and the process of centrally handling an exception and efficiently re-using memory objects when handling exceptions using the global object manager are the focus of the present invention.

Figure 1:
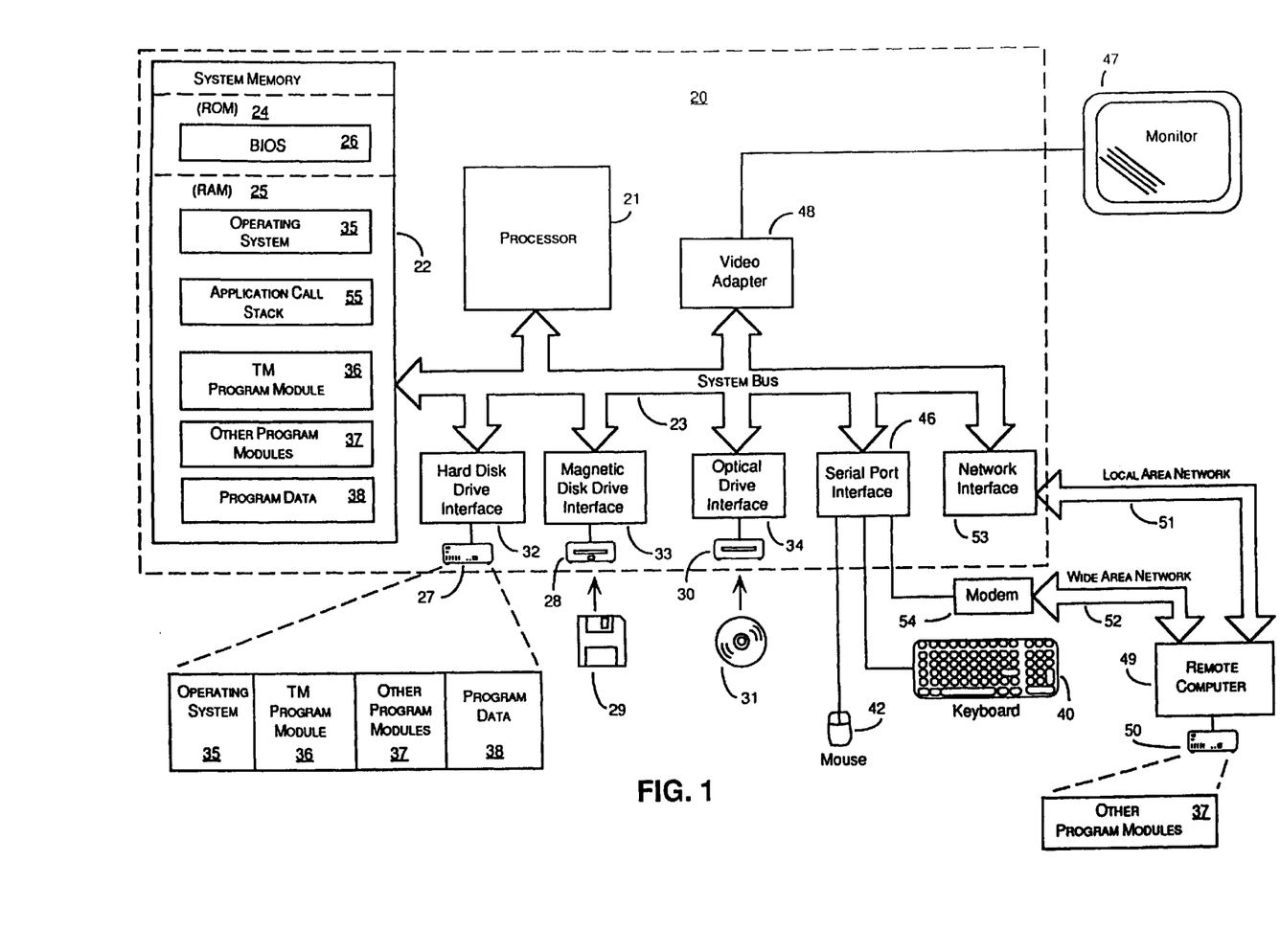
FIG. 1 is a block diagram of a personal computer that provides an exemplary operating environment for an embodiment of the present invention.
Figure 2:
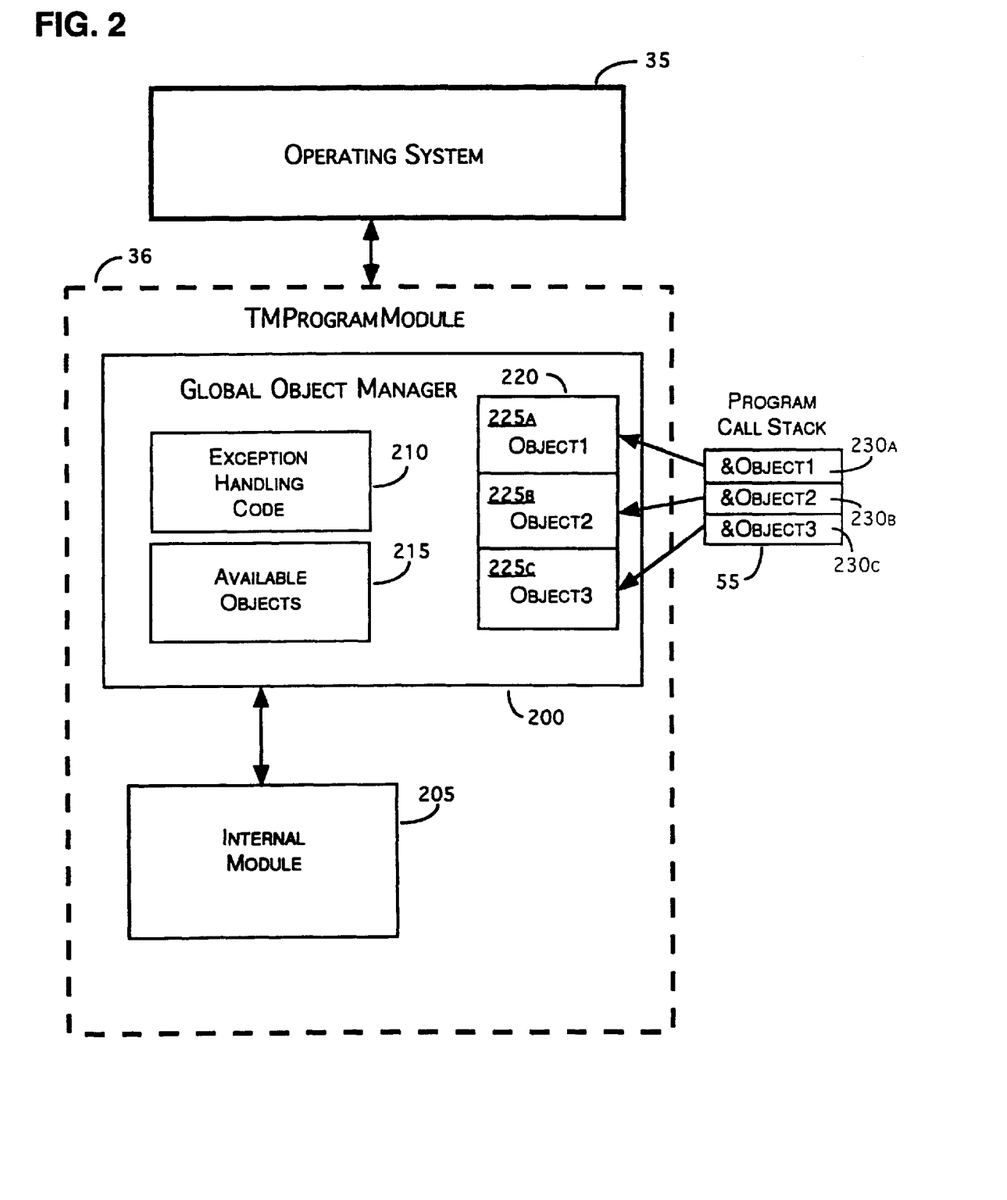
FIG. 2 is a diagram illustrating the interaction between an operating system, a team manager program module, a global object manager module within the TM program module, and a program's call stack of system memory allocated to the team manager program module by the operating system.
Figure 3:
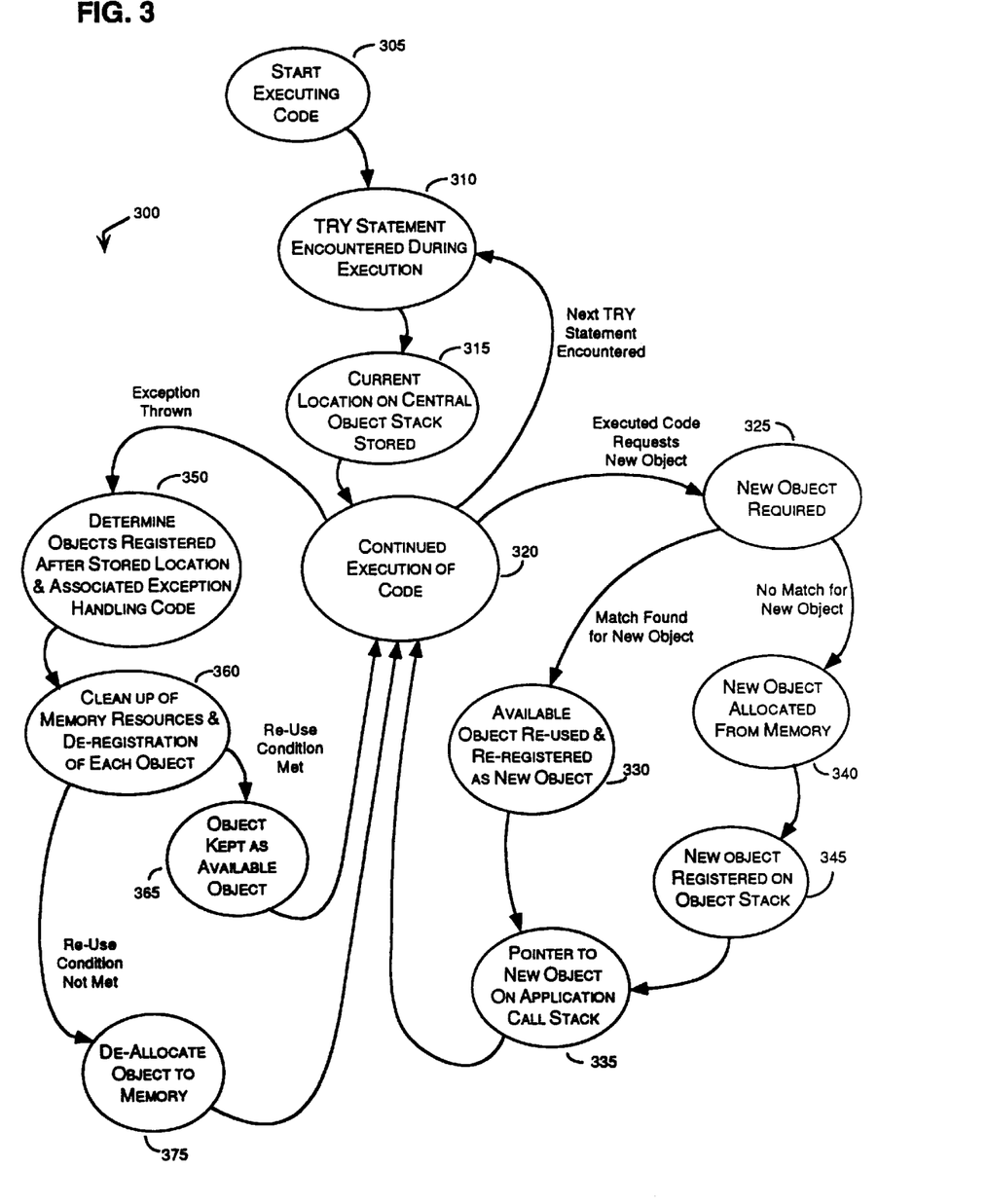
FIG. 3 is a state diagram illustrating the steps for centrally handling a runtime error while efficiently re-using objects already allocated from memory in accordance with an exemplary embodiment of the present invention.

In FIG. 1, the operating environment for an embodiment of the present invention is illustrated. FIG. 2 illustrates the global object manager data structure having distinct inter-relating modules used for centrally handling a runtime exception and efficiently re-using allocated objects. The interrelationships between the global object manager and other software components in the operating environment of the present invention are also illustrated. FIG. 3 is a state diagram illustrating the steps, using the global object manager, for centrally handling a runtime error while efficiently re-using objects already allocated from memory in accordance with an exemplary embodiment of the present invention.

The detailed description which follows is represented largely in terms of processes and symbolic representations of operations by a conventional computer. The processes and operations performed by the computer include the manipulation of signals by a processor and the maintenance of these signals within data sets or data structures resident in one or more memory storage devices. Essentially, a "data structure" is an organizational scheme applied to data or an object so that specific operations can be performed upon that data or modules of data so that specific relationships are established between organized parts of the data structure. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, code, symbols, nodes, numbers, points, data, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as executing, adding, comparing, allocating, de-allocating, marking, determining, grouping, re-using, selecting, registering, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from a CD-ROM disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above includes the hard disk drive 27, a removable magnetic disk 29 and an optical disk 31, such as a CD, it should be appreciated by those skilled in the art that other types of media which are readable by a computer, such as magnetic cassettes, flash memory cards, digital video disks and tapes, Bernoulli cartridges, and the like, may also be used in the exemplary operating environment.

A number of program modules may be stored in the drives and RAM 25, including an operating system 35, one or more application programs, such as the TM program module 36, other program modules 37, and program data 38 used by program modules. A portion of the system memory 22 is allocated as a call stack 55 to individual program modules, such as the TM program module 36. Basically, the program's call stack 55 is a memory stack for called elements encountered during execution of the related program module.

The operating system 35, in conjunction with the BIOS 26 and associated device drivers, provides the basic interface between the computer's hardware and software resources, the user, and program modules such as the publishing program module 36. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

As discussed earlier, the preferred embodiment of the present invention is embodied in the TM program module 36, which is designed to operate in conjunction with Microsoft Corporation's "WINDOWS 95" or "WINDOWS NT" operating systems. However, it should be understood that the invention can be implemented for use with other operating systems, such as Microsoft Corporation's "WINDOWS 3.1" operating system, IBM Corporation's "OS/2" operating system, SunSoft's "SOLARIS" operating system used in workstations manufactured by Sun Microsystem, Hewlett-Packard's "HP-UX" operating system, and the operating system used in "MACINTOSH" computers manufactured by Apple Computer, Inc.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Likewise, those skilled in the art will appreciate that the TM program module 36 provides a wide variety of features and functions in addition to exception handling included in the brief description presented above.

Interaction between Software Components

FIG. 2 is a diagram highlighting a global object manager within the TM program module and illustrating the interaction between the operating system, the TM program module, the global object manager module, and the program's call stack allocated to the TM program module. In an exemplary embodiment of the present invention, these software components, and the internal memory structures within the TM program module 36, interact with each other when handling exceptions and allocating objects.

Referring now to FIGS. 1 and 2, the operating system 35 allocates a portion of system memory 22 to the TM program module 36 as the call stack 55. The program's call stack 55 is essentially a memory stack for called functions and their associated objects encountered during execution of the TM program module 36. As previously mentioned, the present invention involves a system and method for enhanced exception handling which avoids the need to unwind the program's call stack 55 and which avoids the need to place extra code on the program's call stack 55. In order to reduce the burden of dealing with the program's call stack 55, the TM program module 36 has an object manager module. The object manager module is a data structure, generally called a global object manager 200 (GOM).

In one embodiment, the GOM 200 centrally handles exceptions thrown by the TM program module 36. An exception is deemed to be thrown when a section of code is executed and an abnormal event or error occurs. An example of such a section of code is an exemplary internal module 205 of the TM program module 36. When the exemplary internal module 205 is executed, an exception may be thrown and the GOM 200 would handle the exception.

To implement exception handling, the GOM 200 maintains a central object stack 220 of registered objects currently in use, preferably on a per-thread basis. The GOM 200 places or registers allocated objects on the thread's central object stack 220. Prior to entering the section of code where an exception may occur, the current location (stack address) on the central object stack 220 is marked and stored. If an exception occurs within the section of code, the GOM 200 handles the exception using the central object stack 220 and the centrally maintained exception handling code 210.

Essentially, the exception handling code 210 within the GOM 200 pops off objects 225a–c on the central object stack 220 added or registered since the stored location or address. In this manner, the objects popped off the central object stack 220 are deemed to be unregistered from the central object stack 220. The memory (e.g., the system memory 22) associated with each of the objects are cleaned up and the object is either saved for re-use or de-allocated from system memory 22 before continuing with execution of the section of code.

Furthermore, in the exemplary embodiment, the GOM 200 is used to efficiently allocate all objects needed by the executing code from a portion of system memory 22 called the heap. In general, there are two types of allocated objects: (1) automatically allocated objects and (2) dynamically allocated objects. An automatically allocated object is an object constructed or created by the compiled code for a specific function and is automatically destroyed or de-allocated at the end of the function. On the other hand, a dynamically allocated object is created but can remain allocated after the end of the function. One skilled in the art will realize that it is traditionally up to the programmer to handle construction and destruction of a dynamically allocated object.

In the exemplary embodiment, when a new object is required (either as an automatic variable or a dynamic variable), the new object is requested from the GOM 200. In response to the request, the GOM 200 attempts to re-use an existing object from a cache or pool of available objects 215. The existing object is an available object which is already allocated from the system memory 22 but is not currently in use by the TM program module 36. Thus, the available object is not registered on the central object stack 220. If one of the existing objects in the cache 215 matches the type of the new object, the available object may be used and registered on the central object stack 220 as the new object. However, if none of the objects in the cache of available objects 215 match the type of the new object, the new object is allocated from the system memory 22.

Once a new object is registered on the central object stack 220, a pointer referring to the new object is registered on the program's call stack 55, rather than the new object. Thus, the new object corresponds to the pointer on the program's call stack 55. In this manner, the pointer is treated as the new object while the actual new object and the associated exception handling code 210 is centrally stored within the GOM 200. In the exemplary embodiment, the pointer is an exception or error handling macro, defined as a reference type (&ref), directing the allocation of the new object to be performed by the GOM 200.

Normally, a new object needed by the executing program code would be allocated on the program's call stack 55. However, in the exemplary embodiment, the new object is essentially wrapped with a macro as a reference type pointer to the GOM 200. The macro typically has a format of _EH(ClassName, VariableName). For example, the following declaration of local class variables or new objects would normally be allocated on the program's call stack 55:

Cstring str1 ("ABC"); /New character string object

CIntArray arr1, arr2; /New array object

This is the traditional method of allocating the new objects via the program's call stack 55. However, using an embodiment of the present invention, new objects can be allocated by the GOM 200 separate from the program's call stack 55 by wrapping these new objects in exemplary exception handling macros as follows:

_EH_INIT (Cstring, str1, "ABC"); /New character string object

_EH (CIntArray, arr1, arr2); /New array object

In this manner, only the macro or pointer is registered on the program's call stack 55. The macro directs the allocation and exception handling to be performed by the GOM 200 according to the arguments of the macro.

Referring to FIG. 2, the dicotomy of the new object and the pointer to the new object can be further illustrated. Object1 225a is registered on the central object stack 220 as an object in use by the exemplary internal module 205. A pointer to Object1 225a, symbolically represented as &Object1 230a, is registered on the program's call stack 55. In this manner, the amount of code and data on the program's call stack 55 are minimized while Object1 225a and the exception handling code 210 corresponding to Object1 225a are centrally maintained within the GOM 200. This avoids the need to have exception handling code 210 inserted on the program's call stack 55 at each location where an instance of a related object appears.

Therefore, the pointer on the program's call stack 55 is treated as the new object by the code while the pointer refers to the actual new object on the central object stack 220 within the GOM 200. In the exemplary embodiment, when these exception handling macros or pointers are used in the code, all built-in compiler exception handling is turned off. This bypass of the built-in exception handling scheme is needed in order to reclaim the undesirably large code and data space used on the program's call stack 55 for this compiler feature.

Once the program (such as the code embodied within the exemplary internal module 205 of the TM program module 36) has finished with a given object, the object is returned to the GOM 200. The GOM 200 determines whether to free the object or to keep the object as one of the allocated available objects in the cache 215. If the object is set free, the object is de-allocated back to system memory 22. However, if the object is kept as an available object, the object is kept in the cache 215 pending re-use by the GOM 200.

In summary, the GOM 200 data structure maintains which objects are currently in use on the central object stack 220. The GOM 200 data structure centrally maintains exception handling code 210, separate from the program's call stack 55, for recovering from the exception. Furthermore, the GOM 200 uses the cache of available objects 215 when allocating new objects and handling exceptions in order to re-use objects. In this manner, the program's call stack 55 is dedicated to the executing section of code within the internal module 205 while the GOM 200 efficiently allocates and re-uses objects and centrally handles any exceptions thrown when executing the section of code.

Programming Interface to the GOM

In another aspect of the present invention, a method is provided for communicating between an executing client process and an object manager process when handling an exception. This method describes an application programming interface (API) to the GOM 200 used when centrally handling exceptions of a program.

In more particular detail, the GOM 200 is a data structure containing data, such as the objects on the central object stack 220, and functions and methods for operating on the data. These functions and methods are made available to executing client processes via an application programming interface (API). Once called or issued, the functions and methods are handled by an object manager process, i.e., the GOM 200. In an exemplary embodiment, the API for handling exceptions and allocating/re-using objects is called CEHManager. The CEHManager API includes six distinct functions and methods accessible to executing client processes.

The Init( ) method establishes the cache of available objects 215 in system memory 22. Furthermore, the Init( ) function initially sets the cache 215 to be empty, i.e., without any available objects already allocated from system memory 22.

The Quit( ) method frees or de-allocates any available objects left within the cache 215. Typically, the Quit( ) method is called just prior to shutdown of an application program having code which uses the GOM 200, such as the TM program module 36.

The AllocObject( ) function efficiently allocates a new object for used by the section of code being executed (the executing client process). The allocation of the object depends upon a tag which describes the type of object desired. When the GOM 200 receives a call for the AllocObject( ) function, the GOM 200 checks the cache 215 for an available object matching the type of the new object, i.e., the new object tag. If an available object matches the new object type, the matching available object is re-used as the new object, avoiding the need to allocate another object from system memory 22. However, if the cache 215 does not include an available object matching the new object type, the GOM 200 allocates the new object from system memory 22. In the exemplary embodiment, there are two arguments used with the AllocObject( ) function: EHTags eObjType and fOnStack. The eobj Type argument specifies that the allocated object have a type EHTags. Basically, EHTags is a generic type that enumerates the different types of objects in the program. The fOnStack argument is a flag or special programming parameter indicating use of the GOM 200 for allocating objects. If fOnStack is FALSE, then the GOM 200 is not used for allocating objects and the programmer must take responsibility for cleanup. If fOnStack is TRUE, then the GOM 200 is responsbile for allocating objects and cleaning up the memory associated by the objects.

The FreeObject( ) method is called to indicate that an object is no longer in use. When the GOM 200 receives a call for the FreeObject( ) method, the GOM 200 unregisters the object from the central object stack 220 and cleans up the memory associated with the object using the appropriate exception handling code 210. If a predetermined condition for re-using the object is met, the object is returned to the cache of available objects 215 already allocated from system memory 22. However, if the predetermined condition is not met, the GOM 200 de-allocates the object back to system memory 22.

In general, the predetermined condition for re-using an object is dependent upon how a program re-uses particular types of objects. In the one embodiment of the present invention, the predetermined condition is if the cache of available objects 215 includes less than a predefined number of available objects matching the type of the unregistered object. In other words, only a predefined number of objects of a given type should be maintained as available objects. Maintaining more than this predefined number of available objects becomes inefficient because of the large inventory of available objects never being re-used. The exact number of available objects for each type of object is empirically determined for each particular program and can be experimentally optimized.

In another embodiment of the present invention, the predetermined condition is when the allocated size of the unregistered object is less than a threshold size. This avoids maintaining a very large allocated object within the cache of available objects 215. It may be more efficient to de-allocate an object that is too large. In this way, smaller units of system memory 22 may be allocated from the larger unit of de-allocated system memory 22 without a danger of incurring a great deal of memory fragmentation.

In the exemplary embodiment, there are two arguments used with the Freeobject( ) method: pobj and EHTags eObj Type. The pObj argument is the pointer to the specific object to be unregistered from within the GOM 200. This specific object must have the type specified by eObj Type. In the FreeObject( ) method, EHTags is the type of the eobjType.

The GetExceptionStackMarker( ) function returns the current location in the central object stack 220 before a section of code is executed. Typically the GOM 200 stores this location and uses it to determine the state of the central object stack 220 prior to when an exception occurred.

The PopExceptionStack( ) method is called after an exception occurs. By calling the PopExceptionStack( ) method, the central object stack 220 is restored to the state marked by the GetExceptionStackMarker( ) function. In other words, the PopExceptionStack( ) method determines which objects were registered on the central object stack 220 after the marked location, unregisters each of these objects, and cleans up the memory associated with each of these objects.

In the exemplary embodiment, there is one argument used with the PopExceptionStack( ) method: EHStackmarker iMarker. The iMarker argument marks where in the central object stack 220 to return. The iMarker argument has type EHStackmarker. In the preferred embodiment, type EHStackmarker resolves to be an integer.

In summary, the GOM 200 is a data structure separate from the program's call stack 55. The GOM 200 contains various modules (such as the exception handling code 210, the cache of available objects 215, and the central object stack 220) which can be accessed via various functions and methods. In an embodiment of the present invention, the GOM 200, via these functions and methods, is used to centrally handle exceptions and efficiently allocate or re-use objects.

Use of the GOM for Exception Handling

FIG. 3 is a state diagram illustrating the steps for centrally handling a runtime error or exception while re-using objects already allocated from memory in accordance with an exemplary embodiment of the present invention. Referring now to FIGS. 1–3, the method 300 begins at state 305 where program code begins execution. Typically in this state, the cache of available objects 215 is initialized to be empty preferably using the Init( ) method of the GOM 200.

At state 310, a predetermined instruction, preferably a modified TRY statement, is encountered during execution of the program code. Essentially, the modified TRY statement differs from the standard TRY statement by automatically calling the GOM 200 as necessary to handle any exceptions which may occur in the section of code after the modified TRY statement.

Immediately after encountering the modified TRY statement at state 310, the current location or address of the central object stack 220 is stored in memory at state 315. The stored location is used as a reference to the state of the central object stack 220 before an exception or runtime error has occurred. In the exemplary embodiment, the location of the central object stack 220 is stored by calling the GetExceptionStackMarker( ) function. After storing or marking the location, execution of the section of code following the modified TRY statement continues at state 320.

At state 320, if the executed code requests a new object via a declaration of the new object, state 320 transitions to state 325. At state 325 the new object is required and the GOM 200 must provide the new object. In the exemplary embodiment, the executed code declaring the new object is a macro, which advantageously directs allocation of the new object to be performed by the GOM 200.

At state 325, the GOM 200 determines if the new object needed by the executing section of code matches one the available objects in the cache 215 preferably via the AllocObject( ) function. In the exemplary embodiment, the new object and available objects in the cache 215 each have an object tag. The object tag associated with a particular object indicates the type of the object, such as a character string object or a two-dimensional integer array object. Thus, the GOM 200 is able to compare the object tag associated with the new object to the object tags of the available objects in the cache of available objects 215.

If the GOM 200 finds an available object which matches the new object, state 325 transitions to state 330 where the available object is re-used as the new object. In state 330, the available object is re-registered on the central object stack 220 as the new object currently allocated and in use by the section of code. The advantage of re-using an available object from the cache 215 is that the available object has already been allocated from system memory 22. In this way, re-using the available object as the new object helps to avoid system memory fragmentation.

In the exemplary embodiment, the TM program module 36 is a multi-threaded application program. In other words, several processes, including the process embodied within the exemplary internal module 205, are executed in rapid sequence within the single TM program module 36. These processes, or threads as they are known in the art, essentially use the GOM 200 for exception handling and efficient object allocation and re-use.

Accordingly, the GOM 200 preferably maintains a central object stack 220 for each executing thread using system memory 22 local to each thread so that each thread has its own independent central object stack 220 of objects registered as being in use. This is useful for thread-independent exception handling and clean up.

In state 335, a pointer is registered or placed onto the program's call stack 55 associated with the executing section of code. The pointer is advantageously treated as the new object on the program's call stack 55 while, in reality, the new object is actually on the central object stack 55 of the GOM 200.

On the other hand, if the GOM 200 does not find an available object which matches the new object, state 325 transitions to state 340. In state 340, the GOM 200 allocates the new object from system memory 22 because re-use of an available object is not an option. Once allocated from system memory 22, the new object is then registered onto the central object stack 220 in state 345 before transitioning to state 335.

In state 335, a pointer referring to the new object is placed on the program's call stack 55. After the pointer is placed, execution of the section of code after the modified TRY statement continues in state 320.

However, if an exception occurs during execution of the section of code, an exception is deemed to have been "thrown" and state 320 transitions to state 350. In state 350, the GOM 200 determines which objects registered on the central object stack 220 were registered prior to the most recent stored location from state 315 preferably using the PopExceptionStack( ) method. The GOM 200 also determines or selects an exception handling code 210 associated with each of the objects registered on the central object stack 220 prior to the stored location. In this manner, the GOM 200 discovers which memory objects need to be cleaned up and handled as a result of the exception before transitioning to state 360.

In state 360, the GOM 200 executes the exception handling code 210 (more generally referred to as error handling code) preferably via the FreeObject( ) method. The exception handling code cleans up the system memory 22 associated with the objects registered after the most recent stored location. The exception handling code 210 is centralized within the GOM 200, thereby avoiding the need to replicate it throughout the compiled executable code. Thus, execution of the exception handling code 210 advantageously depends only upon the objects registered on the central object stack 220.

Furthermore, the exception handling code 210 within the GOM 200 handles dynamically allocated objects. Exception handling of dynamically allocated objects was not previously done using the built-in exception handling schemes of the prior art. The prior art exception handling schemes were limited to handling only automatically allocated objects and relied upon the programmer's own customized exception handling schemes to account for any dynamically allocated objects.

One skilled in the art will appreciate that, in the exemplary embodiment, all objects are dynamically allocated using the GOM 200 rather than automatically through the efforts of a compiler. Thus, all exception handling is centralized and automatic through the use of the central object stack 220 and the centrally maintained exception handling code 210. In this manner, a great deal of memory overhead is avoided and size of the compiled executable form of the program is greatly reduced. In one example, the extra code required to handle the exceptions for each local object was up to 70 bytes using the built-in exception handling scheme of the compiler. When using the SETJMP/LONGJMP exception handling scheme, which does not require unwinding the program's call stack 55 to handle exceptions, the extra code required was approximately 45 bytes for each local object. However, using the GOM 200, the compiled code size expands only by approximately 3 bytes for each local object. This kind of drastic memory reduction when handling exceptions is the focus of one aspect of the present invention.

Once the appropriate objects are cleaned up, the objects are unregistered from the central object stack 220. In this cleaned up and unregistered state, each of the objects is either kept as an available object or de-allocated back to the system memory 22 depending on predetermined conditions for re-use, as described below.

State 360 transitions to state 365 if a predetermined condition for re-use is met. As previously mentioned, the predetermined condition for re-use is generally dependent upon how a program re-uses particular types of objects. In the exemplary embodiment, empirical statistics were gathered on the TM program module 36 regarding various factors on exception handling and object re-use. These factors include:

the number of allocated objects of all types, the maximum number of all objects allocated at any given time, the average number of objects in use at any time for each type of object, the maximum number of objects allocated for each type of object at any given time, the total number of objects allocated in typical user scenarios (program code dependent) for each type of object, and a percentage of the requests for a new object that resulted in reuse of a previously allocated object from the cache 215 for each type of object.

Generally, the predetermined condition for re-use can be determined from these kinds of use and re-use statistics particular to the program code. Furthermore, the predetermined condition for re-use may be heuristically tuned or refined by analysis of these empirical statistics. As previously mentioned, in the one embodiment of the present invention, the predetermined condition is if the cache of available objects 215 includes less than a predefined number of available objects matching the type of the unregistered object. In other words, only a predefined number of objects of a given type are allowed to be maintained as available objects. The exact number of available objects for each type of object is determined and optimized experimentally for each particular program. For example, in the exemplary embodiment, the predetermined number of character string types of objects is set to three based upon empirical statistics of exception handling and object allocation within the TM program module 36.

In another embodiment of the present invention, the predetermined condition is when the allocated size of the unregistered object is less than a threshold size. This avoids maintaining a very large allocated object within the cache of available objects 215. It may be more efficient to de-allocate a large object so that smaller units of system memory 22 may be allocated from the larger unit of de-allocated system memory 22 without a danger of incurring a great deal of system memory 22 fragmentation. For example, in the exemplary embodiment, the threshold size is set to 50 kilobytes for a character string type of object.

In state 365, the unregistered object is kept or maintained within the cache 215 as an available object because the predetermined reuse condition is met. In this manner, additional memory fragmentation is minimized. State 365 transitions back to state 320 after the unregistered object is kept as an available object pending re-use by the GOM 200.

However, if the predetermined re-use condition is not met, state 360 transitions to state 370. In state 370, the unregistered object is freed or de-allocated back to system memory 22 before the execution of the section of code continues in state 320.

Once executing code again back in state 320, if another TRY statement is encountered, state 320 transitions back to state 310 and state 315. In states 310–315 the current location on the central object stack 220 is once again stored and marked for future reference in anticipation of another exception being thrown.

In summary, the GOM 200 is used for handling exceptions and for efficiently allocating or re-using memory objects during execution of a section of program code. More particularly, the GOM 200 is used for centrally tracking the objects in use on a per-thread basis using a central object stack 220. The GOM 200 is also used for centrally maintaining exception handling code 210 associated with the objects currently in use. Furthermore, the GOM 200 is used for efficiently allocating objects or re-using objects from a cache 215 of in order to minimize memory fragmentation.

Conclusion

From the foregoing description, it will be appreciated that the present invention provides a system and method for centrally handling a runtime error or exception using a central object stack 220 and exception handling code 210 using a data structure called a global object manager 200. The global object manager 200 is a data structure separate from the program's call stack 55. When a modified TRY statement is executed, a location is marked on the central object stack 220. During execution of a section of code after the modified TRYstatement, if a new object is needed, the global object manager 200 efficiently allocates the new object. The global object manager 200 either allocates the new object directly or attempts to re-use a previously allocated object in a cache of available objects 215 as the new object. The new object is then registered on the central object stack 220 and a pointer to the new object is registered on the program's call stack 55.

When an exception is thrown, the global object manager 200 cleans up and unregisters an object, which was registered on the central object stack 220 since the marked location. If a re-use condition is met, the object is kept as an available object already allocated from memory. However, if the re-use condition is not met, the object is deallocated from memory.

The foregoing data structure, system, and method may be conveniently implemented in a program module that is based upon the state diagram in FIG. 3 and the related discussions concerning the GOM 200. No particular programming language is required for carrying out the various procedures described above because it is considered that the operations, functions, methods, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of handling an exception by the GOM 200 within the TM program module 36 using the central object stack 220 and centralized exception handling code 210. However, those skilled in the art will understand that the principles of the present invention apply to any process that handles runtime errors or re-uses memory objects during execution of a section of code.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer system for handling a runtime error of a program, comprising:
   a processor;
   a memory coupled to the processor, the memory maintaining the program, an available object already allocated in the memory and a central object stack; and
   the processor being operative to:
   (a) request a new object,
   (b) determine if the new object matches the available object,
   (c) if the new object matches the available object, register the available object on the central object stack as the new object, thereby re-using the available object,
   (d) if the new object does not match the available object, allocate the new object from the memory and register the new object on the central object stack, and
   (e) when the runtime error occurs, unregister the new object from the central object stack so that the runtime error is handled.

2. The computer system of claim 1, wherein the memory further maintains a cache of available objects already allocated from the memory, the available object being maintained within the cache pending re-use.

3. The computer system of claim 1, wherein the new object has a new object tag and the available object has an available object tag; and
   wherein the processor is further operative to determine if the new object tag is the same as the available object tag in order to determine if the new object matches the available object.

4. The computer system of claim 1, wherein the memory further maintains a call stack of the program, the call stack being separate from the central object stack; and
   wherein the processor is further operative to place a pointer on the call stack of the program, the pointer referring to the new object on the central object stack.

5. A computer system for handling a runtime error of a program, comprising:
   a processor;
   a memory coupled to the processor, the memory maintaining the program, a central object stack, and a registered object already allocated from the memory, the registered object being registered on the central object stack; and
   the processor being operative to:
   (a) when the runtime error occurs, unregistering the registered object from the central object stack,
   (b) determine if a predetermined condition for re-using the unregistered object is met,
   (c) if the predetermined condition is met, maintain the unregistered object in the memory as an available object already allocated from the memory, and
   (d) if predetermined condition is not met, de-allocate the unregistered object from the memory.

6. The computer system of claim 5, wherein the memory further maintains a call stack of the program, the call stack being separate from the central object stack; and
   wherein the processor is further operative to (e) place a pointer on the call stack of the program, the pointer corresponding to the new object on the central object stack.

7. The computer system of claim 5, where in the memory further maintains a cache of available objects already allocated from the memory, the available object being maintained within the cache pending re-use.

8. The computer system of claim 7, wherein the predetermined condition is if the cache of available objects includes less than a predefined number of available objects of the same type as the unregistered object.

9. The computer system of claim 7, wherein the predetermined condition is if the allocated size of the unregistered object is less than a threshold.

10. A computer system for handling a runtime error of a program, comprising:
    a processor;
    a memory coupled to the processor for maintaining:
       the program,
       an available object already allocated in the memory,
       a central object stack, and
       a registered object already allocated in the memory, the registered object being registered on the central object stack; and
    the processor being operative to:
    (a) request a new object,
    (b) determine if the new object matches the available object already allocated from the memory,
    (c) if the new object matches the available object, register the available object on the central object stack as the new object, thereby re-using the available object,
    (d) if the new object does not match the available object, allocate the new object from the memory and register the new object on the central object stack,
    (e) in the event that the runtime error occurs, unregister the new object from the central object stack, (f) determine if a predetermined condition for re-using the unregistered object is met, (g) if the predetermined condition is met, maintain the new object in the memory as another available object already allocated from the memory, and (h) if the predetermined condition is not met, de-allocate the new object from the memory.

11. The computer system of claim 10, wherein the new object has a new object tag and the available object has an available object tag; and wherein the processor is further operative to compare the new object tag to the available object tag in order to determine if the new object matches the available object.

12. The computer system of claim 10, wherein the predetermined condition is if a cache of available objects in the memory includes less than a predefined number of available objects of the same type as the new object.

13. The computer system of claim 10, wherein the predetermined condition is if the allocated size of the new object is less than a threshold.

14. The computer system of claim 10, wherein the memory further maintains a call stack of the program, the call stack being separate from the central object stack; and wherein the processor is further operative to place a pointer on the call stack of the program, the pointer referring to the new object on the central object stack.

15. A computer-readable medium having stored thereon a plurality of modules for handling a runtime error of a program, the plurality of modules representing a data structure, comprising:

a first of the modules representing a central object stack, the central object stack containing an object corresponding to a pointer in a call stack of a program module, the call stack being external to data structure; and a second of the modules representing an error handling code corresponding to the object and separate from the call stack, the error handling code being capable of cleaning up memory associated with the object.

16. The computer-readable medium of claim 15, wherein the object on the central object stack is deemed to be in use during execution of the program module.

17. The computer-readable medium of claim 16, wherein the object is registered on the central object stack; and further comprising a third of the modules representing an available object, the available object being allocated from the memory but not registered on the central object stack.

18. The computer-readable medium of claim 17, wherein the available object is capable of being registered on the central object stack if needed by the program module, so that the available object is re-used from the memory.

19. The computer-readable medium of claim 18, wherein the third of the modules represents a cache of available objects already allocated from the memory, the available object being maintained within the cache.

* * * * *